US007246081B2

(12) United States Patent
Hill (10) Patent No.: US 7,246,081 B2
(45) Date of Patent: *Jul. 17, 2007

(54) METHOD OF FACIAL CODING MONITORING FOR THE PURPOSE OF GAUGING THE IMPACT AND APPEAL OF COMMERCIALLY-RELATED STIMULI

(76) Inventor: Daniel A. Hill, 1268 Pennsylvania Ave., Apt. 2, San Diego, CA (US) 92103

( * ) Notice: Subject to any disclaimer, the term of this patent is extended or adjusted under 35 U.S.C. 154(b) by 0 days.

This patent is subject to a terminal disclaimer.

(21) Appl. No.: 11/418,981

(22) Filed: May 5, 2006

(65) Prior Publication Data

US 2006/0206371 A1 Sep. 14, 2006

Related U.S. Application Data

(63) Continuation of application No. 09/948,196, filed on Sep. 7, 2001, now Pat. No. 7,113,916.

(51) Int. Cl.
*G06Q 10/00* (2006.01)
(52) U.S. Cl. ...................................................... 705/10
(58) Field of Classification Search .................. 705/10
See application file for complete search history.

(56) References Cited

U.S. PATENT DOCUMENTS 3,034,500 A 5/1962 Backster, Jr.

(Continued)

FOREIGN PATENT DOCUMENTS

JP 08115367 A * 5/1996

OTHER PUBLICATIONS

Assessing User Competence: Conceptualization and Measurement Barbara L. Marcolin, Deborah R. Compeau, Malcolm C. Munro, Sid L. Huff. Information Systems Research. Linthicum: Mar. 2000. vol. 11, Iss. 1; p. 37.*

(Continued)

*Primary Examiner*—Romain Jeanty
*Assistant Examiner*—Jonathan G. Sterrett
(74) *Attorney, Agent, or Firm*—Sherill Law Offices, PLLC (57) ABSTRACT

A method of assessing consumer reaction to a marketing stimulus, involving the steps of (a) exposing a sample population to a marketing stimulus for a period of time, (b) interviewing members of the sample population immediately after exposure of the members to the marketing stimulus, (c) videotaping any facial expressions and associated verbal comments of individual members of the sample population during the exposure period and interview, (d) reviewing the videotaped facial expressions and associated verbal comments of individual members of the sample population to (1) detect the occurrence of action units, (2) detect the occurrence of a smile, (3) categorize any detected smile as duchenne or social smile, (4) detect the occurrence of any verbal comment associated with a detected smile, and (5) categorize any associated verbal comment as positive, neutral or negative, (e) coding a single action unit or combination of action units to a coded unit, (f) associating coded units with any contemporaneously detected smile, (g) translating the coded unit to a scored unit, (h) tallying the scored unit by scoring unit category, (i) repeating steps (d) through (h) throughout the exposure period, (j) repeating steps (d) through (h) for a plurality of the members of the sample population, (k) calculating an impact value for each scoring unit category by multiplying the tallied number of scored units for each scoring unit category by a predetermined impact factor for that scoring unit category, (l) calculating an appeal value for each scoring unit category by multiplying the tallied number of scored units for each scoring unit category by a predetermined appeal factor for that scoring unit category, (m) combining the impact values obtained for each scoring unit category to obtain an impact score, (n) combining the appeal values obtained for each scoring unit category to obtain an appeal score, and (o) representing the appeal and impact scores with an identification of the corresponding marketing stimulus to which the members were exposed.

12 Claims, 5 Drawing Sheets

U.S. PATENT DOCUMENTS

| | | | |
|---|---|---|---|
| 3,548,806 | A | 12/1970 | Fisher |
| 3,870,034 | A | 3/1975 | James |
| 4,448,203 | A | 5/1984 | Williamson et al. |
| 4,794,533 | A | 12/1988 | Cohen |
| 4,807,642 | A | 2/1989 | Brown |
| 4,817,628 | A | 4/1989 | Zealear et al. |
| 4,859,050 | A | 8/1989 | Borah et al. |
| 4,964,411 | A | 10/1990 | Johnson et al. |
| 4,975,960 | A | 12/1990 | Petajan |
| 5,031,228 | A | 7/1991 | Lu |
| 5,092,343 | A | 3/1992 | Spitzer et al. |
| 5,219,322 | A | 6/1993 | Weathers |
| 5,247,938 | A | 9/1993 | Silverstein et al. |
| 5,663,900 | A | 9/1997 | Bhandari et al. |
| 5,676,138 | A | 10/1997 | Zawilinski |
| 5,725,472 | A | 3/1998 | Weathers |
| 5,741,217 | A | 4/1998 | Gero |
| 5,772,591 | A | 6/1998 | Cram |
| 5,774,591 | A | 6/1998 | Black et al. |
| 5,802,208 | A | 9/1998 | Podilchuk et al. |
| 5,802,220 | A | 9/1998 | Black et al. |
| 6,004,312 | A | 12/1999 | Finneran et al. |
| 6,008,817 | A | 12/1999 | Gilmore |
| 6,026,321 | A | 2/2000 | Miyata et al. |
| 6,026,322 | A | 2/2000 | Korenman et al. |
| 6,088,040 | A | 7/2000 | Oda et al. |
| 6,099,319 | A | 8/2000 | Zaltman et al. |
| 6,185,534 | B1 * | 2/2001 | Breese et al. ............... 704/270 |
| 6,309,342 | B1 | 10/2001 | Blazey et al. |
| 6,443,840 | B2 | 9/2002 | Von Kohorm |

OTHER PUBLICATIONS

Ekman, Paul and Friesen, Wallace; Manual for the Facial Action Coding System; 1978; 366 pages; Human Interaction Laboratory Departament of Psychiatry,University of California.

Gallup & Robinson, Impact, "CERA-A new System for Measuring Emotion in Advertsing," 9:1, pp. 1-2, Winter 2002.

Ekman, P., Huang, T.S., Sejnowski, T.J., Hager, J.C., Workshop on Facial Expression Understanding, 1992.

Ekman, Paul et al., "Measuring Facial Movement," Environmental Psychology and Nonverbal Behavior, vol. 1, No. 1, p. 56-57, 1976.

Ekman, Paul et al., "Facial Signs of Emotional Experience," Journal of Personality and Social Psychology, vol. 39, No. 6, p. 1125-1134, 1980.

Facial Affect Coding System, Jul. 9, 2001.

Introduction to Facial Measurement, undated.

Sejnowski, T., Computational Neurobiology, Jul. 9, 2001.

Table 11-1 Emotion Predictions.

Ekman, P. & Friesen, W.V., Unmasking The Face, A Guide to Recognizing Emotions from Facial Clues, 1979.

Ekman, P., "Facial Clues to Deceit," Telling Lies, Clues to Deceit in the Marketplace, Politics, and Marriage, p. 123-161, 1992.

Hazlett, R; Hazlett, S; "Emotional Response to Televison Comercials: Facial EMG vs Self-Report.(Statical Data Included)", Mar. 1999, Journal of Advertising Research p. 7.

Lee, C; Kwai, C; Marshal, R; "Measuring Influence of the family decision making process using an observational method", 1998 Qualitative Market Research, p. 88-98.

Gordon-Murnane, Laura "Evaluating Net Evaluators", Feb. 1999, Searcher 7, 2, 57(1).

Frabotta, David; "Changing Focus", Feb. 21, 2000, Hotel & Motel Management p. 1, 68.

Buam, K; Nowicki Jr, S; "Perception of Emotions: Measuring decoding accuracy of adult prosodic cues varying intensity", Summer 1998, Journal of Nonverbal Behavior, p. 89-108.

Chem, Qimei; Nowicki Jr, Stephen; "Attitude toward the Site", Sep. 1999, Journal of Advertising Research, p. 27.

* cited by examiner

METHOD OF FACIAL CODING MONITORING FOR THE PURPOSE OF GAUGING THE IMPACT AND APPEAL OF COMMERCIALLY-RELATED STIMULI

This is a continuation of U.S. patent application Ser. No. 09/948,196 filed Sep. 7, 2001 now U.S. Pat. No. 7,113,916.

FIELD OF THE INVENTION

The invention relates to methods of measuring consumer reaction to marketing stimuli.

BACKGROUND

Facial behavior has typically been gauged by using either comprehensive facial measurements or selective facial measurements. Comprehensive facial measurements include open-ended observations of what is casually seen or direct measurements such as the Facial Action Coding System ("FACS") originally described in Ekman, P., Friesen, W. V., *Facial Action Coding System: A Technique for the Measurement of Facial Movement*, Consulting Psychologists Press, Palo Alto, Calif. (1978). Although direct comprehensive measurements are usually both time consuming and costly, they provide a much greater opportunity to discover unexpected facial action than does mere observation.

Selective facial measurements are used when the facial behavior is known in advance. The researcher must be aware of and attend only to the specific facial actions under investigation. These include selective observer judgments, or direct measurements such as (i) the Maximally Discriminative Facial Movement Coding System ("MAX") originally described in (i) Izard, C. E., *The Maximally Discriminative Facial Movement Coding System*, (Rev. ed.), Instructional Resources Center, University of Delaware, Newark, Del. (1983), (ii) the System for Identifying Affect Expression by Holistic Judgment ("AFFEX") originally described in Izard, C., Dougherty, L., Hembree, E. *A System for Identifying Affect Expressions by Holistic Judgments* (AFFEX), Instructional Resources Center, University of Delaware, Newark, Del. (1983), (iii) the Emotion Facial Action Coding System ("EMFACS") originally described in Ekman, P., Friesen, W., Ancoli, S., *Facial Signs of Emotional Experience, Journal of Personality and Social Psychology*, vol. 39, No. 6, pp. 1125-1134 (1980), and (iv) Ekman, P., Friesen, W., *Measuring Facial Movement, Environmental Psychology and Nonverbal Behavior*, 1 (1), Fall 1976, pp. 56-75, and (v) facial electromyography ("EMG"). A major limitation inherent in measuring facial behavior selectively is that this approach does not usually separate emotional facial behavior from conversational facial behaviors, and certain behaviors characteristic of emotion are emitted.

Investigators have conducted significant research into the use of electronic facial tracking and measurement for various purposes. U.S. Pat. No. 4,975,960, issued to Petajan, discloses an electrical system for obtaining an electronic image of the mouth region in order to facilitate and augment the ability to monitor speech.

U.S. Pat. Nos. 5,774,591 and 5,802,220, issued to Black, disclose an electronic system for tracking human head and facial features over time to capture relative motions for purposes of ascertaining when a sequence of images defines a dominant facial expression. The system seeks a correspondence between predefined facial gestures and perceived facial expressions for the purpose of determining which gestures trigger or support which expressions. The system does not seek to ascertain the underlying emotional response of a participant to a stimulus.

U.S. Pat. No. 5,802,208, issued to Podilchuk et al., discloses an electronic system for obtaining and comparing an electronic image of a face for purposes of recognition.

U.S. Pat. No. 6,088,040, issued to Oda et al., discloses an input/output control mechanism for receiving facial image information related to different facial expressions and normalizing the facial image information for subsequent comparisons.

Facial tracking and measurement have not been applied in the field of marketing analysis. Consumer reaction to a marketing stimulus (e.g., a television commercial) is typically assessed by means of exposing members of a focus group to the marketing stimulus (e.g., having the focus group watch the commercial) and obtaining the reactions and comments of the members immediately after exposure to the marketing stimulus by means of a written questionnaire and/or a personal interview. While generally effective, such focus group techniques suffer from several drawbacks, including a tendency for members of a focus group to express inaccurately or imprecisely their reaction to the marketing stimulus.

Current marketing theory suggests most consumer-purchasing behavior and brand loyalty is dependent on the many facets of the consumer's sensory experiences and take-away impressions—not merely on rational decisions. Marketing efforts seek to match their offerings to the potential consumer's experiences, but lack a sophisticated technique to measure the emotional aspects of their products or services.

Hence, a longstanding need exists for a more reliable, scientific technique and methodology for measuring a consumer's emotional reaction to marketing stimuli.

SUMMARY OF THE INVENTION

The invention is directed to a method of assessing consumer reaction to a marketing stimulus, involving the steps of (a) exposing a sample population comprised of a plurality of members to a marketing stimulus for a period of time, (b) interviewing members of the sample population immediately after exposure of the members to the marketing stimulus, (c) videotaping any facial expressions and associated verbal comments of individual members of the sample population during the exposure period and interview, (d) reviewing the videotaped facial expressions and associated verbal comments of individual members of the sample population to (1) detect the occurrence of action units, (2) detect the occurrence of a smile, (3) categorize any detected smile as duchenne or social smile, (4) detect the occurrence of any verbal comment associated with a detected smile, and (6) categorize any associated verbal comment as positive, neutral or negative, (e) coding a single action unit or combination of action units to a coded unit, (f) associating coded units with any contemporaneously detected smile, (g) translating the coded unit to a scored unit, (h) tallying the scored unit by scoring unit category, (i) repeating steps (d) through (h) throughout the exposure period, (j) repeating steps (d) through (h) for a plurality of the members of the sample population, (k) calculating an impact value for each scoring unit category by multiplying the tallied number of scored units for each scoring unit category by a predetermined impact factor for that scoring unit category, (l) calculating an appeal value for each scoring unit category by multiplying the tallied number of scored units for each scoring unit category by a predetermined appeal factor for that scoring unit category, (m) combining the impact values obtained for each scoring unit category to obtain an impact score, (n) combining the appeal values obtained for each scoring unit category to obtain an appeal score, and (o) representing the appeal and impact scores with an identification of the corresponding marketing stimulus to which the members were exposed.

By visually representing the appeal and impact scores together for a given marketing stimulus on a single illustration, the overall relative marketing value of the stimulus (i.e., extent to which consumers were impacted and whether such impact was favorable or unfavorable) can be understood. Marketing value can be further understood and evaluated by visually representing the percentage of scored units which were positive scoring unit categories and the percentage of scored units which were negative scoring unit categories. Marketing value can still further be understood and evaluated by providing a breakdown of the negative CUs as between the CU types of anger, contempt, disgust, fear, sadness and surprise in accordance with FACS, optionally along with an indication of the percentage of MEs.

The method preferably involves repeating steps (a) through (o) for several different marketing stimuli with members of the sample population, and then visually comparing sets of appeal and the impact scores for each of the marketing stimuli so as to allow a relative comparison of the marketing value of the marketing stimuli.

DETAILED DESCRIPTION OF THE INVENTION INCLUDING A BEST MODE

Definitions

As utilized herein, including the claims, the phrase "action unit," means contraction or other activity of a facial muscle or muscles that causes an observable movement of some portion of the face.

As utilized herein, including the claims, the phrase "coded unit," means any single action unit or combination of action units correlated to a coded unit. The action unit(s) coding to the various coded units are set forth in Table Three herein, and generally correlate to anger, contempt, disgust, fear, happiness, sadness, surprise and micro-expressions as set forth in the Facial Action Coding System ("FACS").

As utilized herein, including the claims, the term "coding," when utilized in connection with action units, means to correlate a detected single action unit or combination of action units with a known single action unit or combination of action units previously recognized as denoting a specific type of coded unit whereby the detected single action unit or combination of action units can be categorized as that type of coded unit. Types of coded units utilized in the method of this invention include those categories of anger, contempt, disgust, fear, happiness, sadness, surprise and micro-expressions as established by the Facial Action Coding System ("FACS") with those coded unit types set forth below in Table Three forming the exclusive types of coded units into which action units can be coded for purposes of this invention. Guidelines for spotting action units and coding the action units to a coded unit are provided in Ekman, P., Friesen, W., *Unmasking the Face—A Guide to Recognizing Emotions From Facial Clues*, Prentice-Hall, Inc., Englewood Cliffs, N.J., the disclosure of which is hereby incorporated by reference.

As utilized herein, including the claims, the phrases "duchenne smile," and "social smile," mean a smile categorized by the "best fit" in accordance with the presence/absence and degree of the individual facial actions set forth in Table One below.

TABLE ONE

| ACTION | DUCHENNE SMILE | SOCIAL SMILE |
|---|---|---|
| Lip Corners Go Up | Yes | Yes |
| Lip Stretches | Yes | Yes |
| Cheeks Pull Upward | Yes | Yes |
| Skin Bags Form Below the Eyes | Yes | No |
| Crow's Feet Wrinkles Form | Yes | No |

As utilized herein, including the claims, the term "expose," means to submit or make accessible to one or more of the five senses of sight, hearing, taste, touch and smell.

As utilized herein, including the claims, the term "interview," means to ask at least one question relating to a marketing stimulus to which a person has just been exposed. An interview may be conducted in any number of settings including seated face-to-face, standing back-to-back, through a one-way mirror, while walking, etc.

As utilized herein, including the claims, the phrase "marketing stimulus," refers to an item selected and designed to (i) advertise, promote and/or enhance the sales or acceptance of a product and/or service, (ii) advertise, promote, improve and/or enhance customer recognition and/or the public image of a person and/or business, (iii) position a product, and/or (iv) enhance brand identity. Exemplary marketing stimuli include television commercials, radio advertisements, print advertisements, billboard advertisements, point-of-purchase displays, store-front signage, packaging, Yellow Pages advertisements, brochures, literature used in mass mailings, web sites, individual web pages, store layouts, interior design of a store, product appearance, product operation, presentation materials, etc.

As utilized herein, including the claims, the term "micro-expression," means a single action unit or combination of action units that do not completely create a full expression and therefore does not fully correlate to a coded unit. A more detailed discussion is provided in Ekman, P., *Telling Lies—Clues to Deceit in the Marketplace, Politics, and Marriage*, WW Norton & Company, New York, 1992, the disclosure of which is hereby incorporated by reference.

As utilized herein, including the claims, a "member appeal score," is obtained by multiplying the tallied number of scored units for each scoring unit category for a single member by a predetermined appeal factor for that scoring unit category to obtain a member appeal value for each scoring unit category, and then combining the member appeal values for all the scoring unit categories.

As utilized herein, including the claims, a "member impact score," is obtained by multiplying the tallied number of scored units for each scoring unit category for a single member by a predetermined impact factor for that scoring unit category to obtain a member impact value for each scored unit category, and then combining the member impact values for all the scoring unit categories.

As utilized herein, including the claims, a "group appeal score," is obtained by summing the member appeal scores for a plurality of members in a sample population to obtain a group appeal value, and then dividing the group appeal value by the number of members whose member appeal scores were included in obtaining the group appeal value and the number of questions asked during the exposure period in excess of one per member.

As utilized herein, including the claims, a "group impact score," is obtained by summing the member impact scores for a plurality of members in a sample population to obtain a group impact value, and then dividing the group impact value by the number of members whose member impact scores were included in obtaining the group impact value and the number of questions asked during the exposure period in excess of one per member.

As utilized herein, including the claims, the phrase "set of appeal and impact scores," means the combination of an appeal score and an impact score obtained for a single member of a sample population for a given marketing stimulus (hereinafter referenced as "member set of appeal and impact scores") or the combination of an appeal score and an impact score obtained for a group of members in a sample population for a given marketing stimulus (hereinafter referenced as "group set of appeal and impact scores").

As utilized herein, including the claims, the term "illustration," includes graphs, charts, and data tables.

As utilized herein, including the claims, the phrase "same media," means within a single type of media, wherein types of media are separated as between (i) television, (ii) radio, (iii) print, (iv) internet, (v) three-dimensional architecture and interior design, (vi) fragrance, (vii) taste tests, (viii) use tests, and (ix) other.

As utilized herein, including the claims, the phrase "same type of goods or services," means goods or services which would be listed under the same topic heading in the most current US West Dex® Yellow Pages directory relative to the date of inquiry as to whether the goods or services are of the same type.

The Method

The method is a rigorous and accurate method of assessing consumer reaction to a marketing stimulus utilizing facial coding (e.g., FACS) and a unique scoring system for determining the extent to which consumers are impacted by a marketing stimulus and whether such impact was favorable or unfavorable. Such a presentation of consumer reaction facilitates the use of such data in making business decisions.

The method enables businesses and organizations to gain a better understanding of their customers' sensory and emotional experiences or take-away impressions to marketing stimuli by providing them with psycho-physiological facial coding assessments of the impact and appeal of the marketing stimuli. The marketing stimuli can be placed within a comparative or even directly competitive context when desired. Use of the method with competing marketing stimuli can be evaluated, providing not only a summary of physiological responses but also a comparison between two summaries, revealing subtle differences. Use of the method enhances the ability of a company to tailor product and marketing efforts to existing and prospective customers.

The method possesses several advantages, including: (1) the ability to capture the subtle, otherwise undetectable ways in which our bodies register and reflect our thoughts and emotions, (2) the ability to capture subconscious physiological responses to stimuli beyond what might be otherwise consciously known and verbally acknowledged, (3) the ability to practice real-time and frame-by-frame assessment of responses during the initial experience of a stimulus and/or during a subsequent interview, (4) the ability to conduct the study in an unobtrusive and non-invasive manner, and (5) an objective based scientific system for monitoring emotional responses which is more accurate and precise than subjective reports.

The method can be usefully and successfully employed in connection with a wide variety of marketing stimuli including specifically, but not exclusively, television programming, television advertising, radio programming, radio advertising, movie trailers, phone messaging systems, customer service dynamics, signage, uniforms, vehicles, offering designs, print ads, direct mail, product packaging and design (including visual and tactile), point of purchase displays, actual packaged or unpackaged products, taste and/or smell tests for products and/or services, store environments, corporate lobbies, logos, brand names, taglines, catalogs, entire web sites, and individual web pages.

Figure 1A:
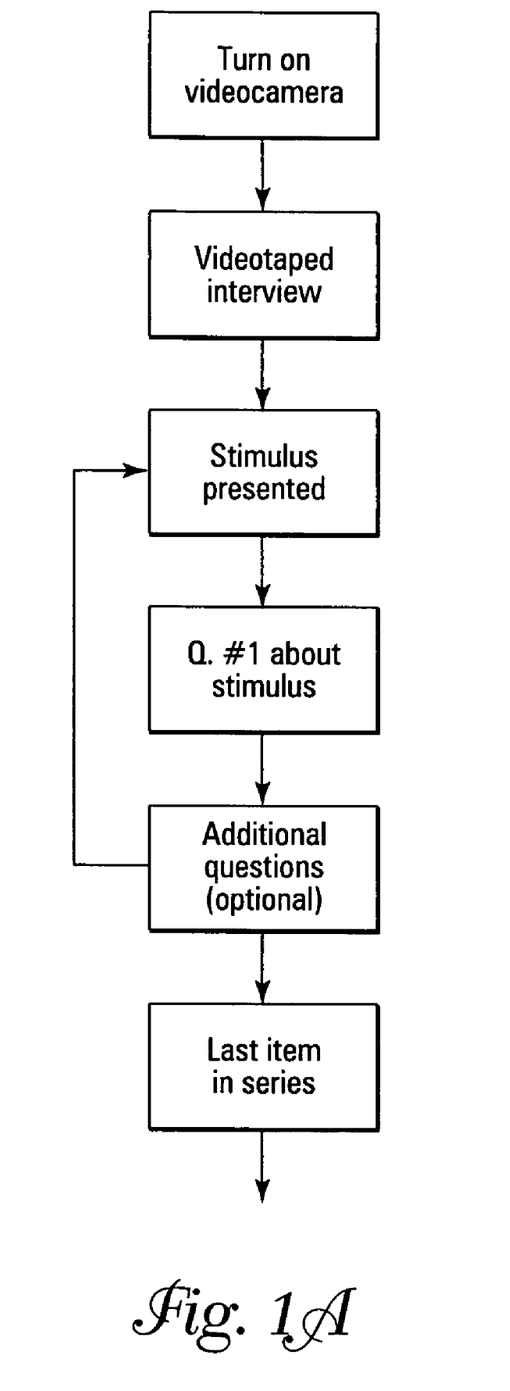
FIG. 1a is a flow chart for one embodiment of the exposure and videotaping steps of the invention.
Figure 1B:
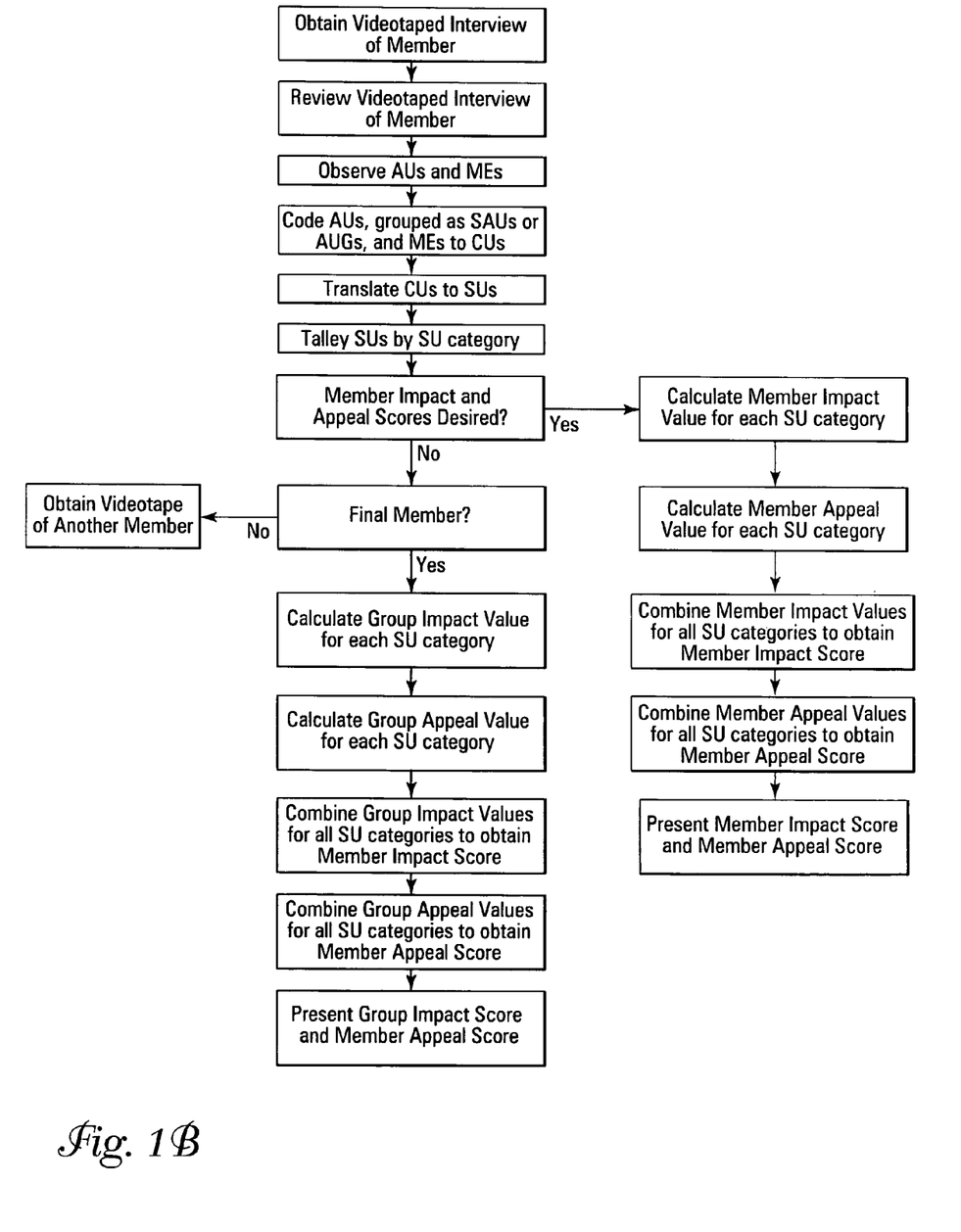
FIG. 1b is a flow chart for one embodiment of the reviewing, translating, tallying, calculating, combining and representing steps of the invention.
Figure 2:
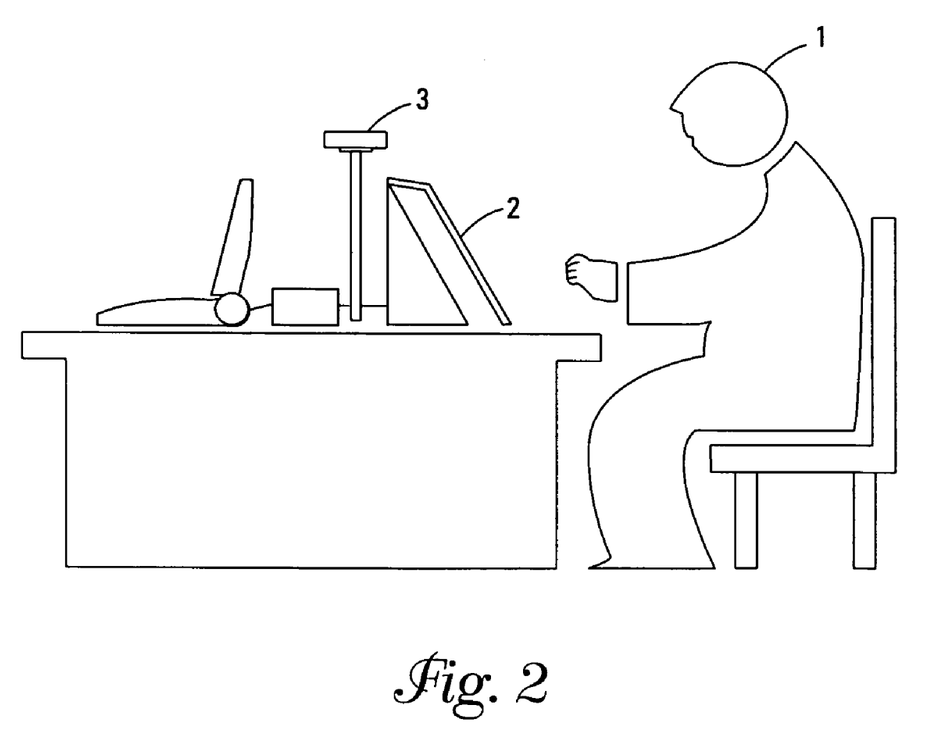
FIG. 2 represents one embodiment of a setting in which the exposure and videotaping steps can be conducted.

Referring generally to FIGS. 1a and 1b, the flow and sequence of steps for one embodiment of the method is depicted. Generally, a subject 1 is recruited for participation as a member of a sample population, sometimes after responding appropriately to several qualification questions (e.g., are they a member of the product target market). The session is recorded by a video camera 2 positioned to ensure that high quality images of the participant's facial expressions are obtained throughout the session. As shown in FIG. 2, the video camera 2 can be mounted on a table 4 immediately behind a display window 2 upon which the marketing stimuli will be presented. The participant 1 should be instructed to (i) look into the camera 2 when answering questions, (ii) avoid any extreme or radical head movement during the session, and (iii) keep from touching their face during the session.

The participant 1 will be exposed to the marketing stimuli one at a time, and asked one or more questions about the marketing stimuli immediately after each exposure (i.e., interviewed), in order to gauge the participant's emotional response to each marketing stimulus. The individual controlling the testing procedure (not shown) has the marketing stimuli prepared and obscured until needed. Care is taken to ensure that the procedure of presenting and removing the marketing stimuli does not distract or inhibit the participant's natural responses to the experience.

Upon completion of the session (i.e., exposure to the entire collection of marketing stimuli and all interviews completed) the videotape is shut off and the participant 1 dismissed. Preferably, the session is repeated for about 10 to 200, preferably about 20 to 100 participants 1.

The videotape of the session is then given to a facial coder (not shown), who studies the videotape in real time and on a second-by-second, frame-by-frame basis to detect action units ("AUs") and smiles (i.e., a combination of AU6 and AU12) in accordance with FACS and as summarized in Table Two below. Bilateral expressions are reported as a micro-expression even when the expression is a bilateral Duchenne smile or bilateral social smile. The facial coder (not shown) is looking for any and all "hits," (i.e., a singular muscle action, or combination of muscle actions that qualify as a full expression within the FACS system or qualifies as a micro-expression ("ME")). The facial coder (not shown) also reports the occurrence of a smile, categorizes any smile as duchenne or social smile, reports the occurrence of any verbal comment associated with a reported smile, categorizes any associated verbal comment as positive, neutral or negative, and reports the presence of any laugh associated with the smile. The facial coder optionally, but preferably, specifies whether any negative comments were directly negative or sarcastic. The facial coder need not report the occurrence and type of any verbal comment associate with a reported duchenne smile when a laugh was present in combination with the duchenne smile.

below in Table Three as the exclusive basis for single action units ("SAUs") and action unit groups ("AUGs") capable of being coded to CUs. However, AUs and MEs associated with speech movement should not be recorded, coded or

TABLE TWO

SINGLE ACTION UNITS

| AU NO. | FACS NAME | MUSCULAR BASIS |
|---|---|---|
| 1 | Inner Brow Raiser | Frontalis, Pars Medialis |
| 2 | Outer Brow Raiser | Frontalis, Pars Lateralis |
| 4 | Brow Lowerer | Depressor Glabellae; Depressor Supercilli; Corrugator |
| 5 | Upper Lid Raiser | Levator Palebrae Superioris |
| 6 | Cheek Raiser | Orbicularis Oculi, Pars Orbitalis |
| 7 | Lid Tightener | Orbicularis Oculi, Pars Palebrali |
| 8 | Lips Toward Each Other | Orbicularis Oris |
| 9 | Nose Wrinkler | Levator Labii Superioris, Alaeque Nasi |
| 10 | Upper Lip Raiser | Levator Labii Superioris, Caput Infraorbitalis |
| 11 | Nasolabial Furrow Deepener | Zygomatic Minor |
| 12 | Lip Corner Puller | Zygomatic Major |
| 13 | Cheek Puffer | Caninus |
| 14 | Dimpler | Buccinnator |
| 15 | Lip Corner Depressor | Triangularis |
| 16 | Lower Lip Depressor | Depressor Labii |
| 17 | Chin Raiser | Mentalis |
| 18 | Lip Puckerer | Incisivii Labii Superioris; Incisivii Labii Inferioris |
| 20 | Lip Stretcher | Risorius |
| 22 | Lip Funneler | Orbicularis Oris |
| 23 | Lip Tightener | Orbicularis Oris |
| 24 | Lip Pressor | Orbicularis Oris |
| 25 | Lips Part | Depressor Labii, or Relaxation of Mentalis or Orbicularis Oris |
| 26 | Jaw Drop | Masetter; Temporal and Internal Pterygoid |
| 27 | Mouth Stretch | Ptergoids; Digastric |
| 28 | Lip Suck | Orbicularis Oris |
| 38 | Nostril Dilator | Nasalis, Pars Alaris |
| 39 | Nostril Compressor | Nasalis, Pars Transversa and Depressor Septi Nasi |
| 41 | Lid Droop | Relaxation of Levator Palpebrae Superioris |
| 42 | Slit | Orbicularis Oculi |
| 43 | Eyes Closed | Relaxation of Levator Palpebrae Superioris |
| 44 | Squint | Orbicularis Oculi, Pars Palpebralis |
| 45 | Blink | Relaxation of Levator Palpebrae and Contraction of Orbicularis Oculi, Pars Palpebralis |
| 46 | Wink | Orbicularis Oculi |

Coding

Coding of AUs and MEs to coded units ("CUs") is conducted in accordance with the emotions prediction analysis established by the Facial Action Coding System ("FACS") utilizing the Emotions Predictions Table set forth scored. The CUs into which the SAUs, AUGs, and MEs may be coded equate to the FACS designations of an expression of happiness, sadness, anger, contempt, dusgust, fear, surprise, or a micro-expression. If the facial coder detects an AUG, which equates to a blend of emotions, the facial coder should code the AUG to multiple CUs for each expression involved.

TABLE THREE

EMOTION PREDICTORS

| CODED UNIT | SAUs AND AUGs CODING FOR CUs | |
|---|---|---|
| (Emotion) | PROTOTYPE SAU/AUG | MAJOR VARIANT SAU/AUG |
| Surprise | 1 & 2 & 5x & 26 | 1 & 2 & 5x |
|  | 1 & 2 & 5x & 27 | 1 & 2 & 26 |
|  |  | 1 & 2 & 27 |
|  |  | 5x & 26 |
|  |  | 5x & 27 |
| Fear | 1 & 2 & 4 & 5* & 20* & (25, 26 or 27) | 1 & 2 & 2 & 5* & L or R20* & 25, 26, or 27 |
|  | 1 & 2 & 4 & 5* & (25, 26 or 27) | 1 & 2 & 4 & 5* |
|  |  | 1 & 2 & 5Z with or without 25, 26, 27 |
|  |  | 5* & 20* with or without 25, 26, 27 |
| Happy | 6 & 12 |  |
|  | 12Y |  |

TABLE THREE-continued

EMOTION PREDICTORS

CODED UNIT  SAUs AND AUGs CODING FOR CUs

| (Emotion) | PROTOTYPE SAU/AUG | MAJOR VARIANT SAU/AUG |
|---|---|---|
| Sadness | 1 & 4 & 11 & 15x (with or without 54 & 64) & (with or without 25 or 26)<br>1 & 4 & 15* (with or without 54 & 64) & (with or without 25 or 26)<br>6 & 15x (with or without 54 & 64) & (with or without 25 or 26) | 1 & 4 & 11 with or without 54 & 64& (with or without 25 or 26)<br>1 & 4 & 15x with or without 54 & 64& (with or without 25 or 26)<br>1 & 4 & 15x & 17 with or without 54 & 64& (with or without 25 or 26)<br>11 & 15x with or without 54 & 64& (with or without 25 or 26)<br>11& 17& (with or without 25 or 26) |
| Disgust | 9<br>9 & 16 & (15 or 26)<br>9 & 17<br>10*<br>10* & 16 & (25 or 26)<br>10 & 17 | |
| Contempt | 10 & 14 | |
| Anger | 4 & 5* & 7 & 10* & 22 & 23 & (25 or 26)<br>4 & 5* & 7 & 10* & 23 & (25 or 26)<br>4 & 5* & 7 & 23 & (25 or 26)<br>4 & 5* & 7 & 17 & 23<br>4 & 5* & 7 & 17 & 24<br>4 & 5* & 7 & 23<br>4 & 5* & 7 & 24 | Any of the prototypes without any one of the following AUs:<br>4, 5, 7, or 10 |

*The AU may be at x, y, or z level of intensity.

Translation

CUs are translated into scored units ("SUs") as set forth below in Table Four. SU categories A, B, C, D, and E are classified as positive SUs. SU categories F, G, H, and J are classified as negative SUs. SU category I is classified as a micro-expression SU.

TABLE FOUR

| CU TYPE | SMILE<br>Duchenne/Social | VERBAL COMMENT<br>+/0/− | LAUGH<br>Yes/No | SU CATEGORY |
|---|---|---|---|---|
| Anger[1] | NA | NA | NA | F |
| Contempt[1] | NA | NA | NA | F |
| Disgust[1] | NA | NA | NA | F |
| Fear[1] | NA | NA | NA | F |
| Happy | Duchenne | + (optional) | Yes | A |
|  | Duchenne | + | No | B |
|  | Duchenne | 0 | No | C |
|  | Social | + | No | D |
|  | Social | 0 | No | E |
|  | Duchenne | − | No | G |
|  | Social | − | No | H |
| Sadness[1] | NA | NA | NA | F |
| Surprise | NA | NA | NA | J |
| Micro-Expression | Bi-lateral only | NA | NA | I |

[1]Micro-expressions of anger, contempt, disgust, sadness, and fear can optionally be translated to SU category I.

Scoring System

A member impact score is obtained by (i) tallying the SUs for a single member of the sample population by SU category, (ii) multiplying the tally of SUs in each SU category by a predetermined impact factor for that SU category to obtain a member impact value for each SU category, and (iii) combining the member impact values for all the SU categories. A group impact score is obtained by summing the member impact scores for a plurality of members in a sample population to obtain a group impact value, and then dividing the group impact value by the number of members whose member impact scores were included in obtaining the group impact value and the number of questions asked during the exposure period in excess of one per member.

Similarly, a member appeal score is obtained by (i) tallying the SUs for a single member of the sample population by SU category, (ii) multiplying the tally of SUs in each SU category by a predetermined appeal factor for that SU category to obtain a member impact value for each SU category, and (iii) combining the member appeal values for all the SU categories. A group appeal score is obtained by summing the member appeal scores for a plurality of members in a sample population to obtain a group appeal value, and then dividing the group appeal value by the number of members whose member appeal scores were included in obtaining the group appeal value and the number of questions asked during the exposure period in excess of one per member.

The relative values of the predetermined impact factor and the predetermined appeal factor for each SU category are set forth below in Table Five. The relative values are subject to refinement, generally within the ranges set forth below, based upon experience.

TABLE FIVE

| | RANGE | | PREFERRED | |
|---|---|---|---|---|
| CU TYPE | Impact Factor | Appeal Factor | Impact Factor | Appeal Factor |
| A | 2½-3½ | 2½-3½ | 3 | 3 |
| B | 2½-3½ | 1½-2½ | 3 | 2 |
| C | 2-3 | 1-2 | 2½ | 1½ |
| D | 1½-2½ | ¾-1¼ | 2 | 1 |
| E | ¾-1¼ | ¼-¾ | 1 | ½ |
| F | 2½-3½ | −1½--2½ | 3 | −2 |
| G | 2-3 | −1--2 | 2½ | −1½ |
| H | 1½-2½ | −¾--1¼ | 2 | −1 |
| I | ¾-1¼ | −¼--¾ | 1 | −½ |
| J | ¾-1¼ | −⅛--⅜ | 1 | −¼ |

It is generally preferred not to score or tally data from those members who held their hands in front of their mouth.

Reporting

A number of reporting options exists for representing the data. Several exemplary options include specifically, but not exclusively, (i) reporting the data separately for each individual stimuli, (ii) reporting the data for a plurality of stimuli in comparative form, (iii) reporting the data separately for each member of the sample population, (iv) graphically reporting the impact and appeal scores with each score forming an axis of the graph, (v) graphically reporting the impact and appeal scores for only a selected portion of the exposure period (e.g., the first two seconds of exposure to the marketing stimuli, the reaction to a specific question, etc.), (vi) graphically reporting the impact and appeal scores for a plurality of distinct portions of the exposure period together on the same graph (e.g., scores during exposure to the marketing stimuli and scores during questioning), and (vii) graphically reporting the percentage of SUs which were positive SUs, negative SUs and MEs.

EXAMPLES

Example 1

The number of participants reported in Table Six below were each exposed to stimuli 1 through 5 in sequence and asked two questions immediately after viewing each stimulus. A facial coder reviewed the videotape of each participant and detected the occurrence of AUs, the occurrence of any smile, and the occurrence of any verbal comment or laughter associated with a smile. The facial coder determined whether the AUs should be treated as a SAU, AUG or ME under FACS, coded the SAUs, AUGs and MEs to CUs by CU type (i.e., emotions of anger, disgust, fear, sadness or surprise) in accordance with FACS, categorized any smile as a duchenne or social smile, and categorized any verbal comment associated with any smile as positive, neutral or negative.

An assistant translated the CUs into SUs. The assistant tallied the SUs by stimulus and by SU category within an Excel® spreadsheet. The categorized tally of SUs for each stimulus is set forth in Table Six.

A group impact value and a group appeal value for each SU category was calculated by multiplying the tallied number of SUs for each SU category by the preferred impact factor or appeal factor for that SU category as set forth in Table Seven. The calculated group impact value and group appeal value for each SU category is set forth in Table Eight. The calculation was completed automatically within the Excel® Spreadsheet, which was previously programmed with the proper formulas.

Group impact and appeal scores were calculated from the group impact values and group appeal values respectively, by separately summing the group impact values and group appeal values for each SU category, and dividing each of the summed values by the number of members of the sample population for that stimulus which were coded and scored plus the number of questions asked of those members in excess of one. The calculated group impact score and group appeal score for each stimulus is set forth in Table Eight.

Figure 3:
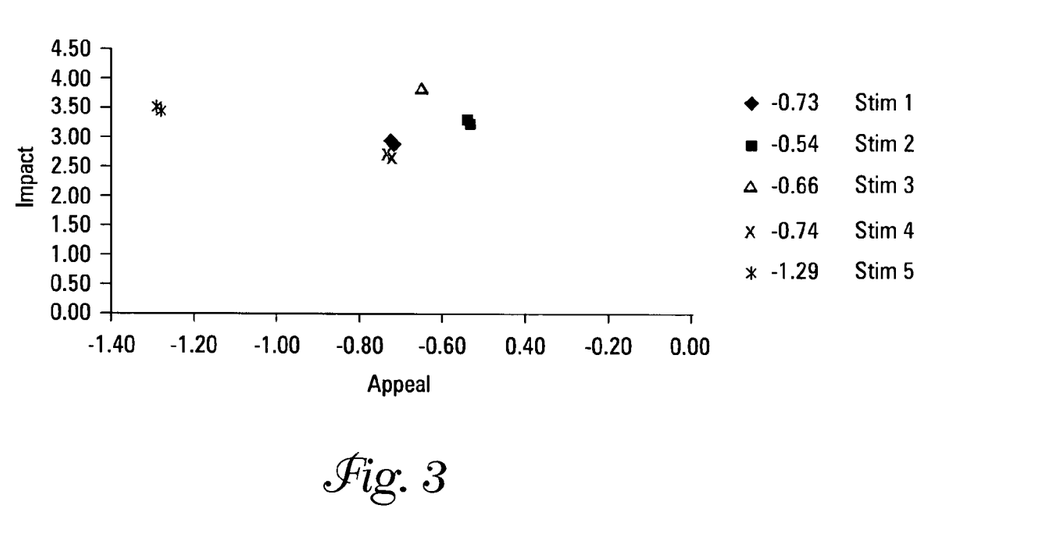
FIG. 3 is a graphical representation of the impact and appeal scores obtained in Example 1.
Figure 4:
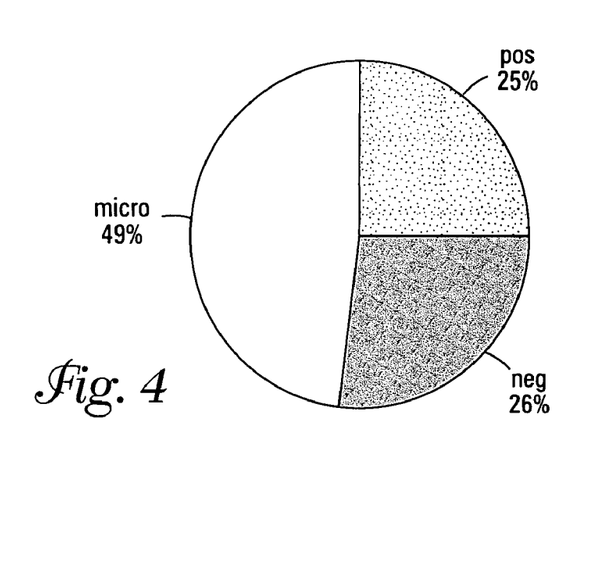
FIG. 4 is a graphical representation of the percentage of positive, negative and micro-expression scored units detected in Example 1 for stimulus 1.
Figure 5:
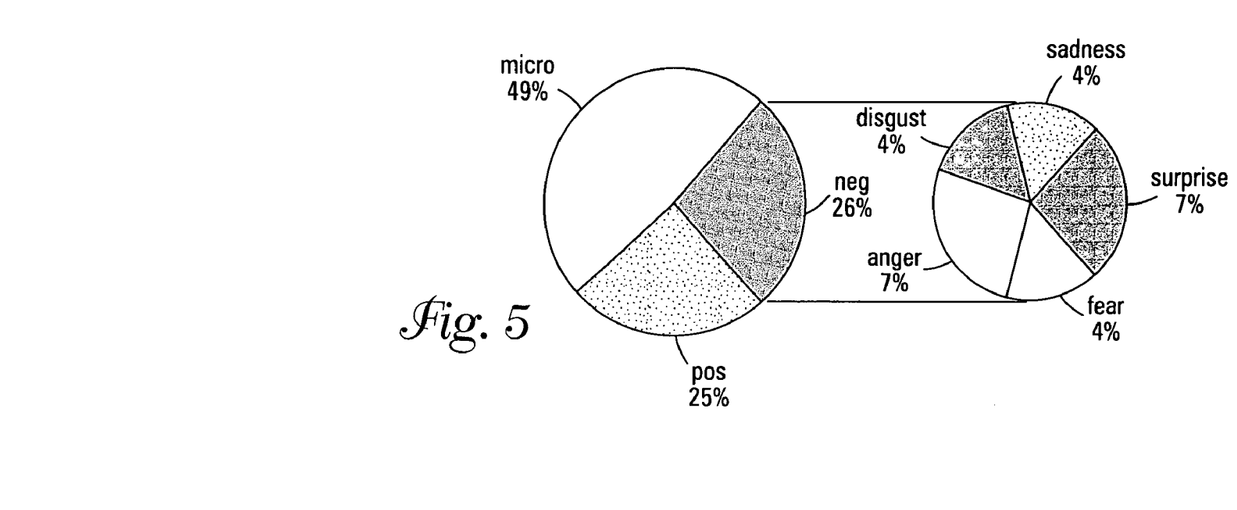
FIG. 5 is a graphical representation of the percentage of coded units within each negative coded unit type (e.g., anger, disgust, fear, sadness and surprise) detected in Example 1 for stimulus 1.

The group impact score and group appeal score for each stimulus is graphically represented in FIG. 3. The percentage of SUs for stimulus 1, which were positive, negative, and micro-expressions is graphically represented in FIG. 4. The percentage of CUs equated to each of the CU types of anger, contempt, disgust, fear, sadness and surprise is graphically represented in FIG. 5.

TABLE SIX

| | Total Sub- | TALLY OF SUs | | | | | | | | | |
|---|---|---|---|---|---|---|---|---|---|---|---|
| Stimuli | jects | A | B | C | D | E | F | G | H | I | J | Total |
| Stim 1 | 39 | 5 | 1 | 0 | 6 | 20 | 4 | 4 | 14 | 116 | 16 | 186 |
| Stim 2 | 39 | 7 | 3 | 4 | 10 | 12 | 3 | 11 | 17 | 92 | 24 | 183 |
| Stim 3 | 39 | 5 | 5 | 6 | 15 | 14 | 4 | 16 | 25 | 89 | 25 | 204 |
| Stim 4 | 40 | 1 | 0 | 1 | 16 | 10 | 2 | 7 | 4 | 124 | 16 | 181 |
| Stim 5 | 40 | 2 | 1 | 1 | 4 | 14 | 5 | 16 | 23 | 122 | 24 | 212 |

TABLE SEVEN

| SU CATEGORY | IMPACT FACTOR | APPEAL FACTOR |
|---|---|---|
| A | 3 | 3 |
| B | 3 | 2 |
| C | 2½ | 1½ |
| D | 2 | 1 |
| E | 1 | ½ |
| F | 3 | −2 |
| G | 2½ | −1½ |
| H | 2 | −1 |
| I | 1 | −½ |
| J | 1 | −¼ |

TABLE EIGHT

CALCULATED IMPACT AND APPEAL VALUES BY SU CATEGORY

| Stimuli | | A | B | C | D | E | F | G | H | I | J | Score |
|---|---|---|---|---|---|---|---|---|---|---|---|---|
| Stim 1 | Impact | 15 | 3 | 0 | 12 | 20 | 12 | 10 | 28 | 116 | 16 | 2.97 |
|  | Appeal | 15 | 2 | 0 | 6 | 10 | −8 | −6 | −14 | −58 | −4 | −0.73 |
| Stim 2 | Impact | 21 | 9 | 10 | 20 | 12 | 9 | 27.5 | 34 | 92 | 24 | 3.31 |
|  | Appeal | 21 | 6 | 6 | 10 | 6 | −6 | −16.5 | −17 | −46 | −6 | −0.54 |
| Stim 3 | Impact | 15 | 15 | 15 | 30 | 14 | 12 | 40 | 50 | 89 | 25 | 3.91 |
|  | Appeal | 15 | 10 | 9 | 15 | 7 | −8 | −24 | −25 | −44.5 | −6.25 | −0.66 |
| Stim 4 | Impact | 3 | 0 | 2.5 | 32 | 10 | 6 | 17.5 | 8 | 124 | 16 | 2.74 |
|  | Appeal | 3 | 0 | 1.5 | 16 | 5 | −4 | −10.5 | −4 | −62 | −4 | −0.74 |
| Stim 5 | Impact | 6 | 3 | 2.5 | 8 | 14 | 15 | 40 | 46 | 122 | 24 | 3.51 |
|  | Appeal | 6 | 2 | 1.5 | 4 | 7 | −10 | −24 | −23 | −61 | −6 | −1.29 |

Conclusions: Stimuli 1 through 4 exhibited nearly equivalent appeal and impact scores, with stimulus 2 exhibiting the greatest appeal and stimulus 3 exhibiting the greatest impact. Stimulus 5 has approximately the same impact as stimuli 1 through 4, but a significantly lower appeal.

The specification is provided to aid in the complete nonlimiting understanding of the invention. Since many variations and embodiments of the invention may be created and devised without departing from the spirit and scope of the invention, the scope of the invention resides in the claims hereinafter appended.

I claim:

1. A method of assessing consumer reaction to a marketing stimulus, comprising:
   (a) exposing a sample population comprised of a plurality of members to a marketing stimulus for a period of time;
   (b) interviewing members of the sample population immediately after exposure of the members to the marketing stimulus;
   (c) videotaping any facial expressions and associated verbal comments of individual members of the sample population during the exposure period and interview;
   (d) reviewing the videotaped facial expressions and associated verbal comments of individual members of the sample population for purposes of detecting the occurrence of action units from the videotaped facial expressions;
   (e) coding a single action unit or combination of action units to a coded unit;
   (f) translating the coded unit to a scored unit;
   (g) tallying the scored unit by scoring unit category;
   (h) repeating steps (d) through (g) throughout the exposure period;
   (i) repeating steps (d) through (g) for a plurality of the members of the sample population; and
   (j) accomplishing at least one of:
      (1) calculating an impact value for each scoring unit category by multiplying the tallied number of scored units for each scoring unit category by a predetermined impact factor for that scoring unit category; combining the impact values obtained for each scoring unit category to obtain an impact score; and representing the impact score with an identification of the corresponding marketing stimulus to which the members were exposed, and
      (2) calculating an appeal value for each scoring unit category by multiplying the tallied number of scored units for each scoring unit category by a predetermined appeal factor for that scoring unit category; combining the appeal values obtained for each scoring unit category to obtain an appeal score; and representing the appeal score with an identification of the corresponding marketing stimulus to which the members were exposed.

2. The method of claim 1 wherein representing the appeal and impact scores comprises visually representing at least one set of appeal and impact scores of at least one member together on a single illustration.

3. The method of claim 1 wherein representing the appeal and impact scores comprises visually representing at least one set of group appeal and group impact scores obtained from at least ten members together on a single illustration.

4. The method of claim 1 further comprising: (k) repeating steps (a) through (j) with members of the sample population for at least one other marketing stimulus which is different from the first marketing stimulus, and (l) visually comparing the appeal scores, the impact scores, or both the appeal scores and the impact scores of the marketing stimuli.

5. The method of claim 4 wherein the marketing stimuli are of the same type.

6. The method of claim 4 wherein the marketing stimuli involve sales or marketing of the same type of goods or services.

7. The method of claim 1 wherein the sample population is comprised of between about 10 to 200 members.

8. The method of claim 4 wherein the sample population is comprised of between about 10 to 10 to members.

9. The method of claim 4 wherein any associated verbal comment is categorized as positive, neutral, direct negative or sarcastic.

10. The method of claim 1 wherein only step (j)(1) is performed.

11. The method of claim 1 wherein only step (j)(2) is performed.

12. The method of claim 1 wherein both steps (j)(1) and (j)(2) are performed.

* * * * *